(12) United States Patent
De Wilde

(10) Patent No.: US 8,157,470 B2
(45) Date of Patent: Apr. 17, 2012

(54) COUPLING BETWEEN TWO OBJECTS, OBJECT INTENDED THEREFOR, AND MOCULAR BUILDING SYSTEM

(75) Inventor: Gerrit Jan De Wilde, Anerveen (NL)

(73) Assignee: Widee B.V., Lutten (NL)

( * ) Notice: Subject to any disclaimer, the term of this patent is extended or adjusted under 35 U.S.C. 154(b) by 1061 days.

(21) Appl. No.: 12/067,615

(22) PCT Filed: Sep. 22, 2005

(86) PCT No.: PCT/NL2005/000687
§ 371 (c)(1), (2), (4) Date: Mar. 20, 2008

(87) PCT Pub. No.: WO2007/035081
PCT Pub. Date: Mar. 29, 2007

(65) Prior Publication Data
US 2008/0267696 A1 Oct. 30, 2008

(51) Int. Cl.
*F16B 21/02* (2006.01)
(52) U.S. Cl. ...................... 403/348; 403/349
(58) Field of Classification Search .......... 403/348–353; 446/105, 111, 113, 122, 128
See application file for complete search history.

(56) References Cited

U.S. PATENT DOCUMENTS

| | | | |
|---|---|---|---|
| 3,811,219 A * | 5/1974 | Fischer | 446/107 |
| 3,873,219 A | 3/1975 | Pofferi | |
| 5,094,643 A * | 3/1992 | Bolli et al. | 446/121 |
| 5,947,787 A * | 9/1999 | Cyrus et al. | 446/127 |
| 6,595,825 B1 * | 7/2003 | De Wilde | 446/102 |
| 6,685,527 B2 * | 2/2004 | Johnson | 446/10 |
| 7,481,692 B2 * | 1/2009 | Bruder | 446/122 |
| D614,481 S * | 4/2010 | Lewis | D8/382 |
| 2011/0039474 A1* | 2/2011 | Bruder | 446/124 |

FOREIGN PATENT DOCUMENTS

| | | |
|---|---|---|
| EP | 830883 A2 * | 3/1998 |
| FR | 2215106 A | 8/1974 |
| FR | 2721074 A | 12/1995 |

* cited by examiner

*Primary Examiner* — Victor MacArthur
(74) *Attorney, Agent, or Firm* — The Webb Law Firm

(57) ABSTRACT

The invention relates to a coupling between two objects via a coupling element. Each object comprises a panel with a continuous hole with four inward protruding tongues which are disposed at 90° to each other and extend over angles of about 22.5°. The coupling element comprises a shank, an insert stop member on both sides so that the coupling element can be inserted in the one or the other direction into the hole, four locking cams on each end zone of the shank which each extend over angles of 22.5° disposed at 0°, (90°−22.5°), 180°, (270°−22.5°), and rotation stop members. The coupling element can be inserted into the hole in a chosen orientation as desired in one of four equidistant angular positions and then rotated through about 22.5° in the one or the other direction, wherein rotation locking means fix the chosen angular position.

8 Claims, 8 Drawing Sheets

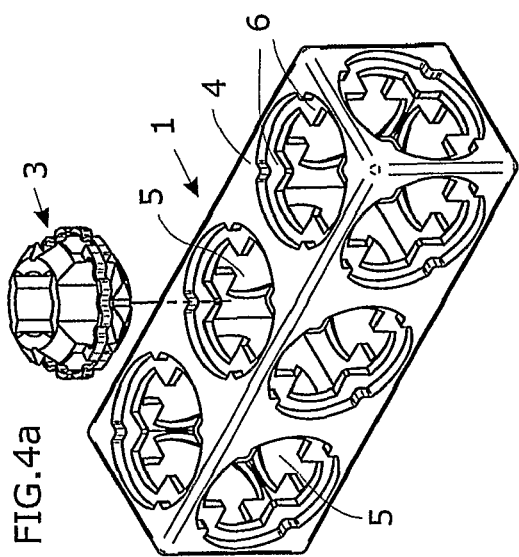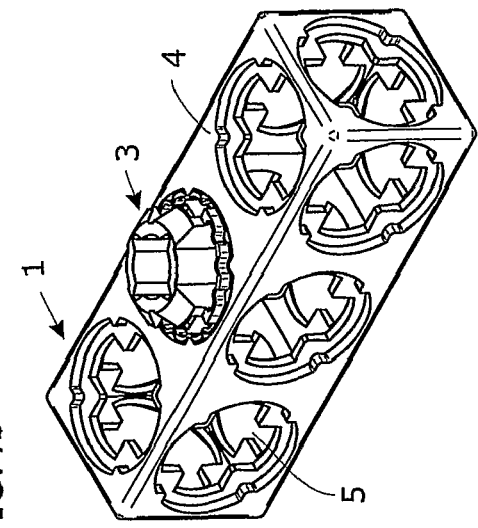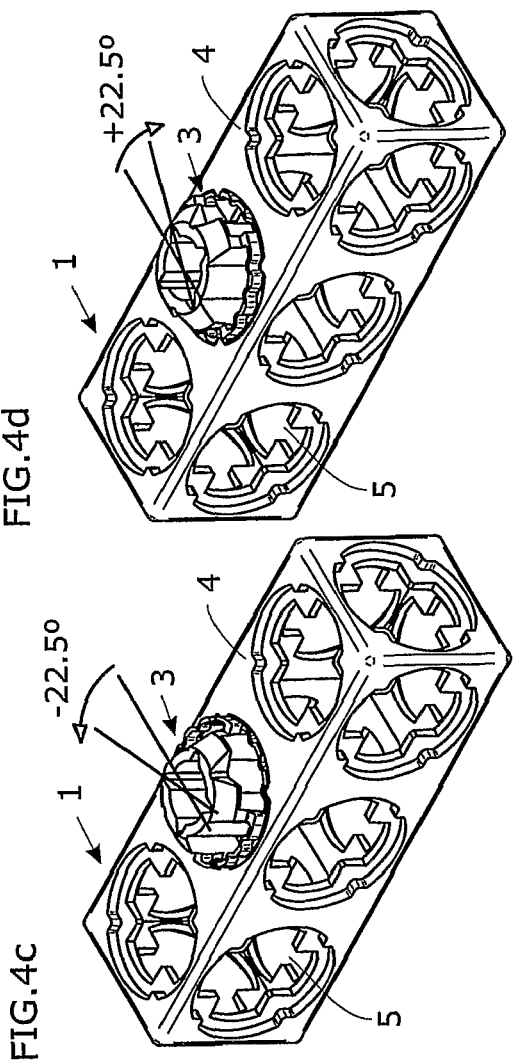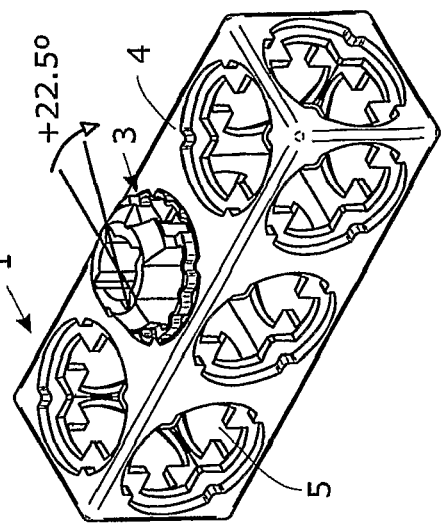

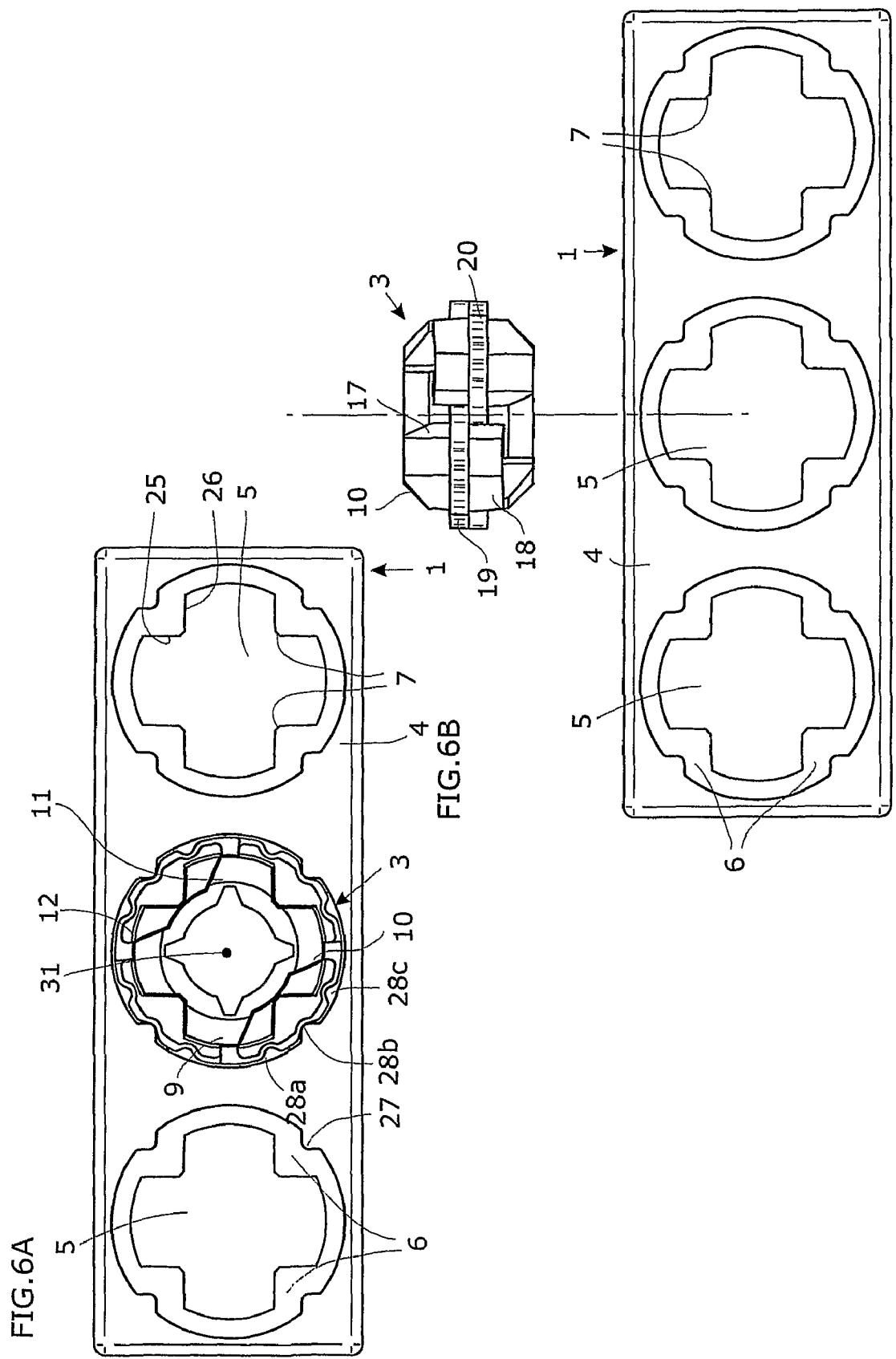

COUPLING BETWEEN TWO OBJECTS, OBJECT INTENDED THEREFOR, AND MOCULAR BUILDING SYSTEM

BACKGROUND OF THE INVENTION

1. Field of the Invention

This invention relates to couplings between two objects.

2. Description of Related Art

Couplings between two objects are known in many embodiments, for instance to serve as basis for toys or for educational purposes. As example can be given the meccano system that has long fallen into disuse wherein objects had one or more panels with one or more continuous holes. Two similar objects could then be coupled using this system by means of a nut-bolt connection. Spatial constructions could in this way be built. Another example is the Lego® system which is intended mainly for younger children.

SUMMARY OF THE INVENTION

It is an object of the invention to provide a coupling between two objects which has in common with the known systems that the coupling between two objects can be selected in a specific manner as desired by the user within a determined number of selection options, and that the coupling is releasable.

It is an object of the invention to embody a coupling such that it provides specific selection options which allow a wide range of variation in the building structures that can be made. According to the invention the releasability does not have to be such that mutually coupled objects come apart easily. It is assumed according to the invention that the user must perform specific well-considered actions to bring about a coupling of a specific type or to release the coupling.

In respect of the above objectives the invention provides a coupling between two objects by means of a coupling element wherein each object comprises:

a panel with a continuous first hole with a round main shape and four inward protruding tongues which each have two sides extending at least more or less in radial direction, which tongues are arranged angularly equidistant and each extend over an angle of substantially 22.5°;

wherein the coupling element comprises:

a shank which can be inserted between the ends of the tongues into the first hole and has an axis;

an insert stop member which is present on the central zone of the shank and which defines the maximum distance over which the shank can be inserted as desired with the one orientation or the other orientation into the first hole;

four locking cams on each of the two end zones of the shank, which locking cams each extend over an angle of substantially 22.5° and are disposed at relative angular positions of substantially 0°, (90°−22.5°), 180°, (270°−22.5°); and four rotation stop members which are each added to a locking cam and arranged angularly equidistant and which can co-act with said sides;

such that the coupling element can be inserted into the first hole in a chosen orientation as desired in one of four angularly equidistant angular positions until the insert stop member comes into contact with the panel and the coupling element can then be rotated relative to the relevant object as desired through substantially 22.5° in the one or in the other direction until the rotation stop member comes into contact with a relevant side, whereby the locking cams; engage behind the panel and the coupling element is locked against axial displacement relative to the panel;

wherein rotation locking means are present for the purpose of releasably locking the coupling element relative to each of the two objects in each possible angular position, i.e. (0°±22.5°), (90°±22.5°), (180°±22.5°), (270°±22.5°).

As noted above, it must only be possible to realize or release the coupling by performing well-considered actions. In this respect the coupling according to the invention preferably has the special feature that the rotation locking means can be carried in and out of their locking state only by exerting a determined rotational moment between the coupling element and the relevant object.

In a specific embodiment the coupling has the special feature that the rotation locking means comprise a combination of a recess and a protrusion engaging elastically therein added at each possible angular position.

A practical embodiment comprises a resilient strip with the main shape of a circular arc, which strip is provided with three recesses which have relative angular positions of −22.5°, 0°, +22.5°.

In a practical embodiment the coupling comprises four strips which are each carried by two adjacent rotation stop members.

The latter two embodiments can advantageously comprise four protrusions which have the same angular positions as the tongues, form part of the panel and can co-act with at least one of four resilient strips which each extend over an angle of substantially 90° and form part of the coupling element.

It is noted that the angles referred to in the foregoing must be deemed as technically functional indications.

In a specific embodiment the coupling has the special feature that each object and/or the coupling element consists of plastic.

This latter embodiment can advantageously be embodied such that each object and/or the coupling element is manufactured by injection-moulding.

The coupling element has a front view which is the same as, or mirror-symmetrical to, the rear view. This provides the option of a coupling in which the coupling element is manufactured by (a) making an extrudate using an extrusion head with an opening having the same form as the front view or the rear view of the coupling element, (b) bringing the extrudate to the desired length, and (c) selectively removing excess portions such that a coupling element is obtained.

The coupling preferably has the special feature that the shank has an axially non-round continuous second hole into which a suitable tool can be inserted and, by exerting a moment by means of this tool, the coupling element can then be rotated relative to the relevant object.

The invention also relates to an object designed and evidently intended as component of a coupling as according to one or more of the above stated specifications, which object comprises at least one panel with at least two continuous first holes such that the object can be coupled by means of at least two coupling elements to at least two further similar objects.

This object can comprise a number of panels with a number of continuous first holes with equal centre-to-centre distances as measured along the surface of the panels, wherein in the case of more than one first hole in a panel these holes are ordered in straight rows and, insofar as applicable, mutually perpendicular rows.

The invention further relates to a modular construction system, intended for instance as toy or for educational purposes, comprising a number of objects as according to the specifications stated in the foregoing paragraphs, in addition to a number of coupling elements for mutually coupling objects by means of coupling elements as desired by a user, whereby a number of objects and coupling elements are assembled into a unit.

Finally, the invention relates to a packaging with a modular construction system as according to the above stated specification.

The invention will now be elucidated with reference to the accompanying drawings.

BRIEF DESCRIPTION OF THE DRAWINGS

FIGS. 4A and 4B, 4C and 4D show on smaller scale and, drawn for the sake of clarity in mutual co-action, the first phase of FIG. 1, the second phase of FIG. 2, the realized third phase of FIG. 3, and the potential third phase of FIG. 4;

FIG. 6A shows a top view corresponding with FIG. 5A of an object and a coupling element inserted in reverse orientation;

FIG. 6B shows a side view of the object and the coupling element in the situation of FIG. 1.

DESCRIPTION OF THE PREFERRED EMBODIMENTS

Figure 1:
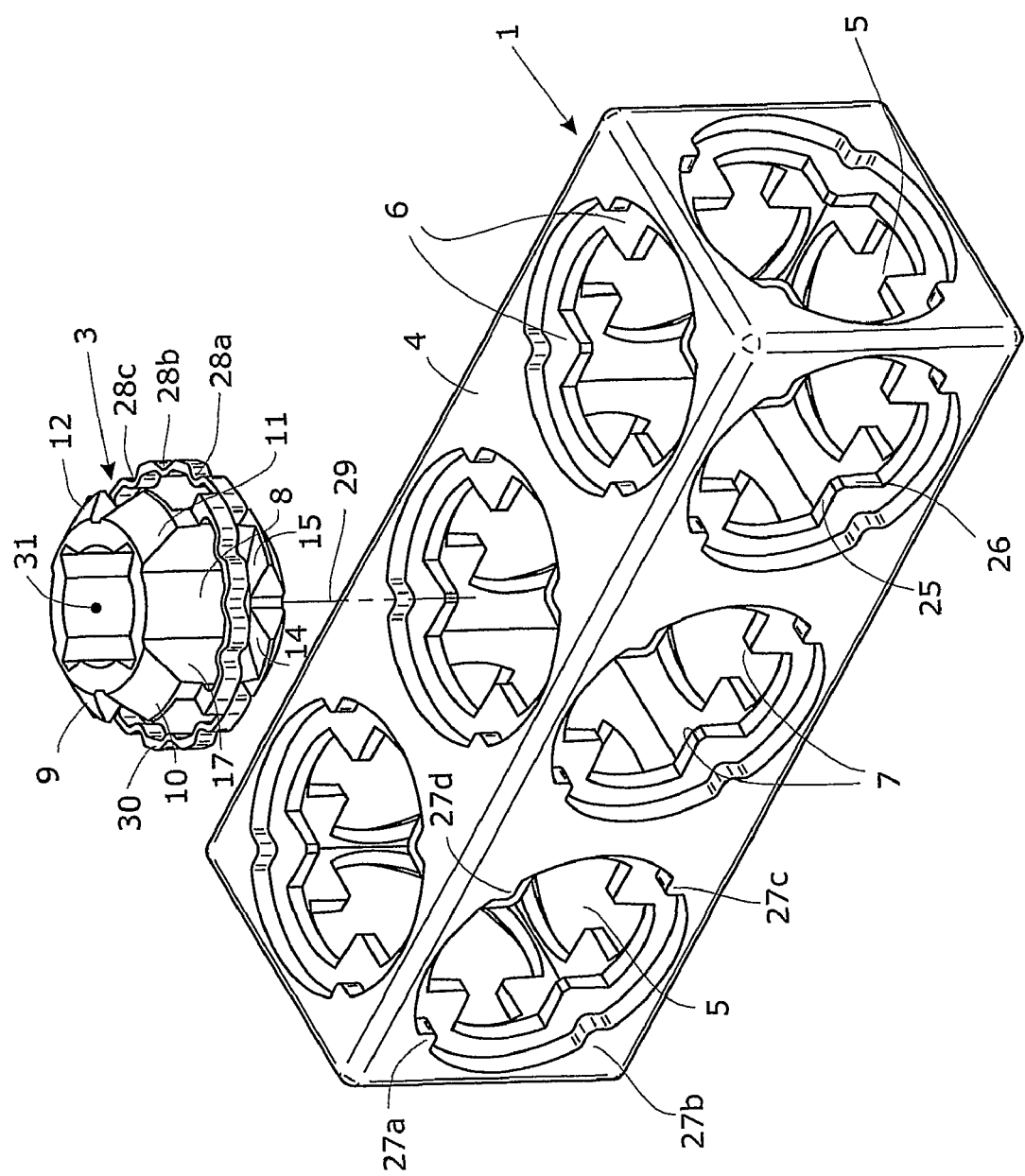
FIG. 1 shows a perspective view of an object and a coupling element drawn at some mutual distance.
Figure 2:
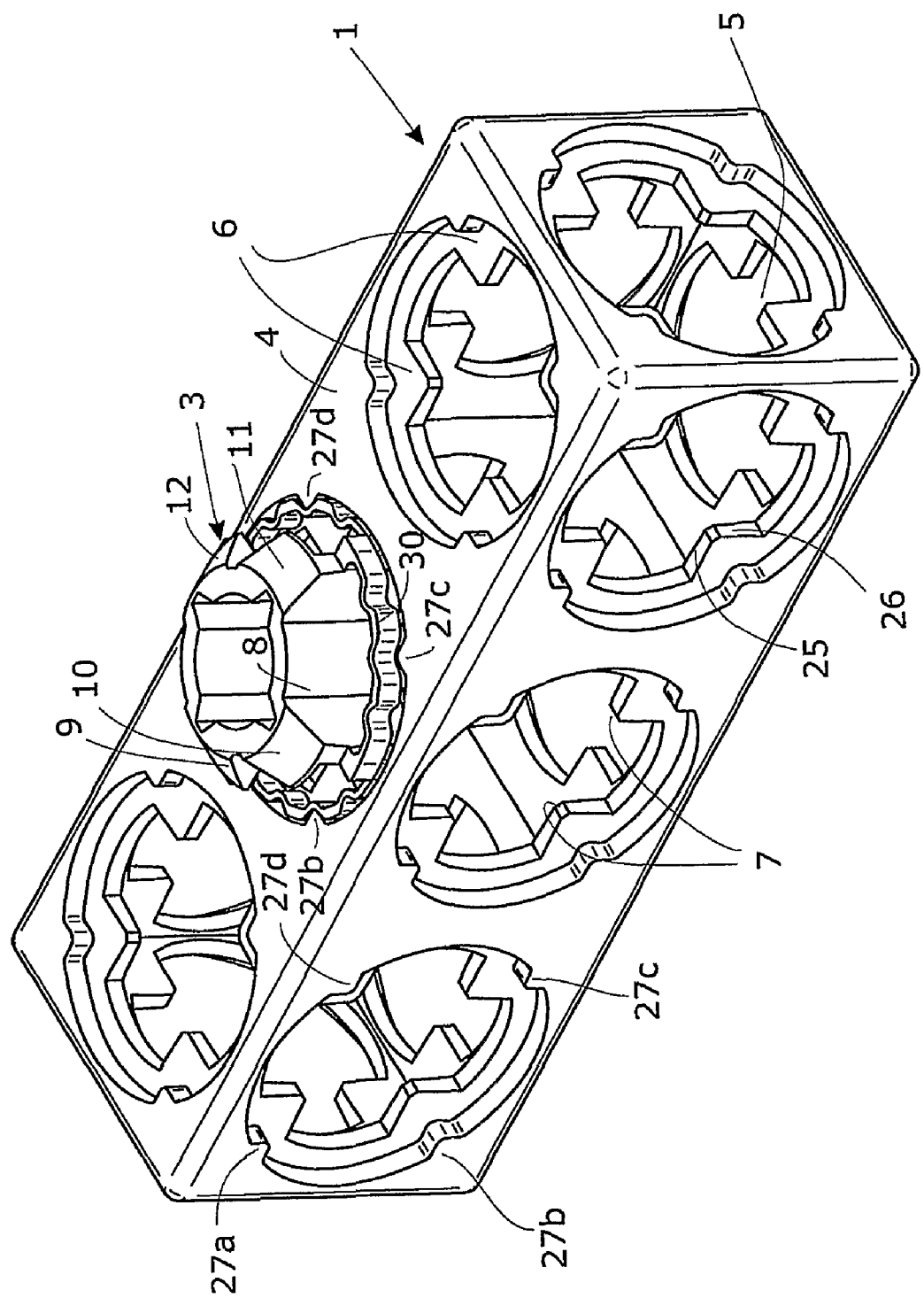
FIG. 2 shows a perspective view corresponding with FIG. 1 in which the coupling element is inserted into the object.
Figure 3:
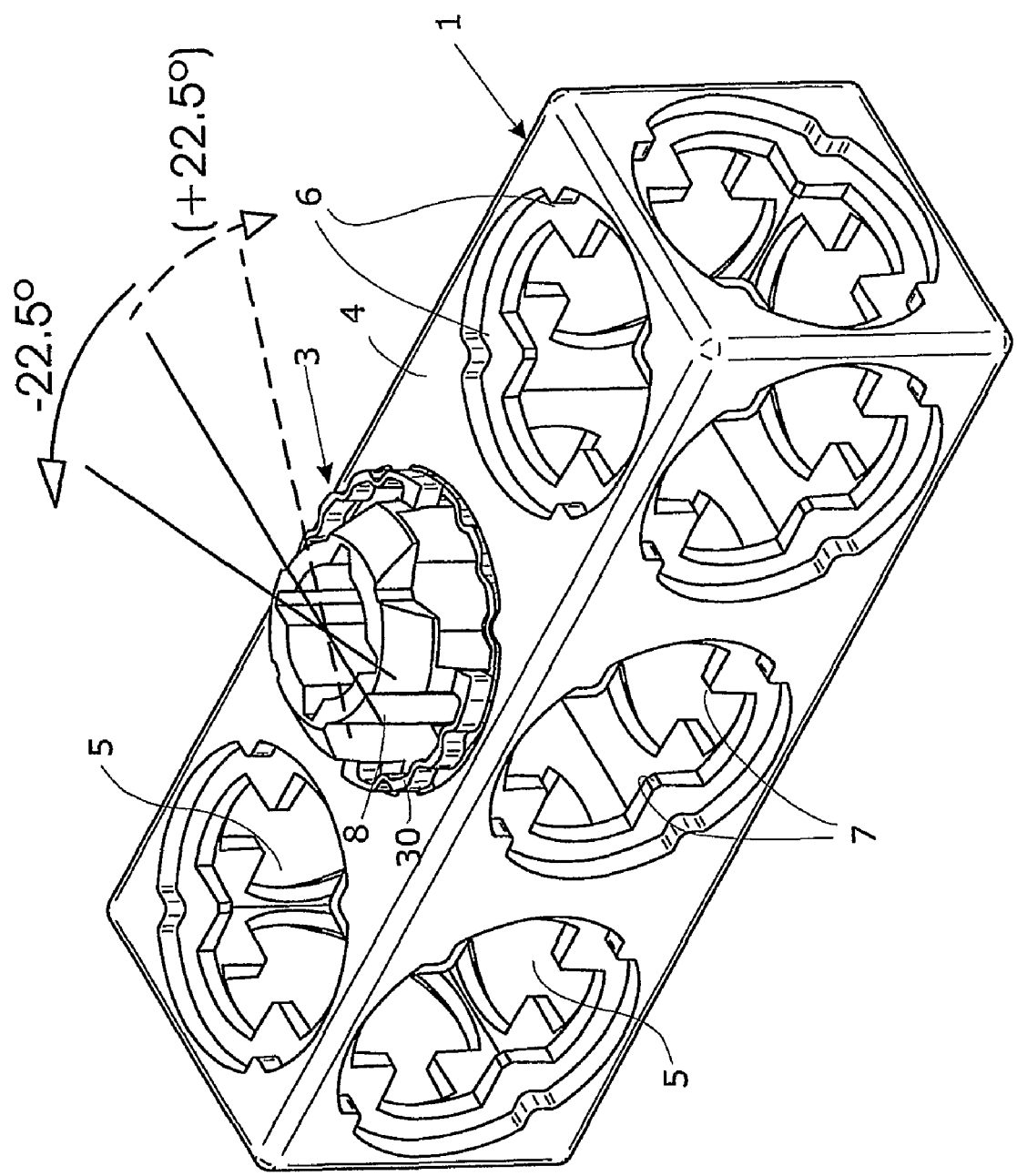
FIG. 3 shows a perspective view corresponding with FIG. 2 in which the coupling element is rotated through 22.5° and is thus secured to the object.

FIG. 1 to 6 show the basic components of a part of a coupling according to the invention. FIG. 7 shows the manner in which these basic components can be assembled with a further object to form a unit on the basis of a complete coupling according to the invention.

Said FIGS. 1 to 6 show a coupling between two objects (1, 2) by means of a coupling element (3);
wherein each object (1, 2) comprises:
a panel (4) with a continuous first hole (5) with a round main shape and four inward protruding tongues (6) which each have two sides (25, 26) extending at least more or less in radial direction, which tongues (6) are arranged angularly equidistant and each extend over an angle of substantially 22.5°;
wherein the coupling element (3) comprises:
a shank (8) which can be inserted between the ends (7) of the tongues (6) into the first hole (5) and has an axis (29);
an insert stop member (19, 20) which is present on the central zone of the shank (8) and which defines the maximum distance over which the shank can be inserted as desired with the one orientation or the other orientation into the first hole (5);
four locking cams (9, 10, 11, 12); (13, 14, 15, 16) on each of the two end zones (17, 18) of the shank (8), which locking cams(9-16) each extend over an angle of substantially 22.5° and are disposed at relative angular positions of substantially 0°, (90°−22.5°), 180°, (270°−22.5°); and four rotation stop members (21, 22, 23, 24) which are each added to a locking cam (9-16) and are arranged angularly equidistant and which can co-act with said sides (25, 26);
such that the coupling element (3) can be inserted into the first hole (5) in a chosen orientation as desired in one of four angularly equidistant angular positions until the insert stop member (19, 20) comes into contact with the panel (4) and the coupling element (3) can then be rotated relative to the relevant object (1, 2) as desired through substantially 22.5° in the one or in the other direction until the rotation stop member (21-24) comes into contact with a relevant side (25, 26), whereby the locking cams (9-12); (13-16) engage behind the panel (4) and the coupling element (3) is locked against axial displacement relative to the panel (4);
wherein rotation locking means (27, 28) are present for the purpose of releasably locking the coupling element (3) relative to each of the two objects (1, 2) in each possible angular position, i.e. (0°±22.5°), (90°±22.5°), (180°±22.5°), (270°±22.5°).

The drawn embodiments are such that the rotation locking means can be carried in and out of their locking state only by exerting a determined rotational moment between the coupling element and the relevant object 1, 2.

The rotation locking means comprise a combination of a recess 28 and a protrusion 27 engaging elastically therein added at each possible angular position.

In the drawn embodiment this coupling comprises a resilient strip 30 with the main shape of a circular arc, which strip is provided with three recesses 28a, 28b, 28c which have relative angular positions of −22.5°, 0°, +22.5°.

The coupling in fact comprises four strips 30 which are each carried by two adjacent rotation stop members 21-24.

The coupling further comprises four protrusions 27a, 27b, 27c, 27d which have the same angular positions as tongues 6, form part of panel 4 and can co-act with at least one of four resilient strips 30 which each extend over an angle of substantially 90° and form part of coupling element 3.

In all the drawn embodiments each object 1, 2 and/or coupling element 3 consists of plastic.

Injection-moulding in particular is a very suitable method of manufacture.

Figure 5A:
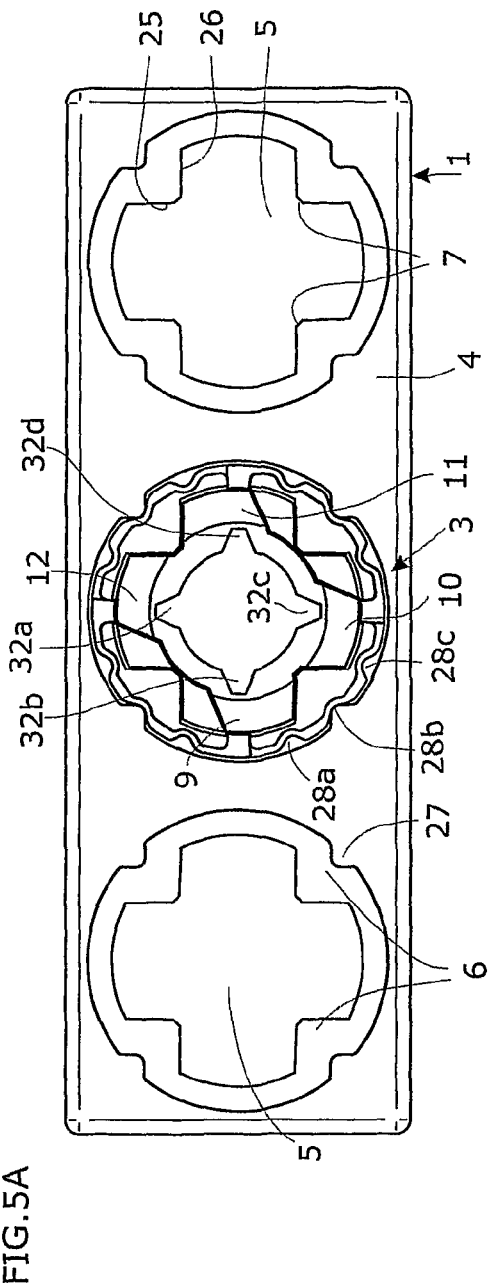
FIG. 5A shows a top view of the object with the coupling element as according to FIG. 2.
Figure 5B:
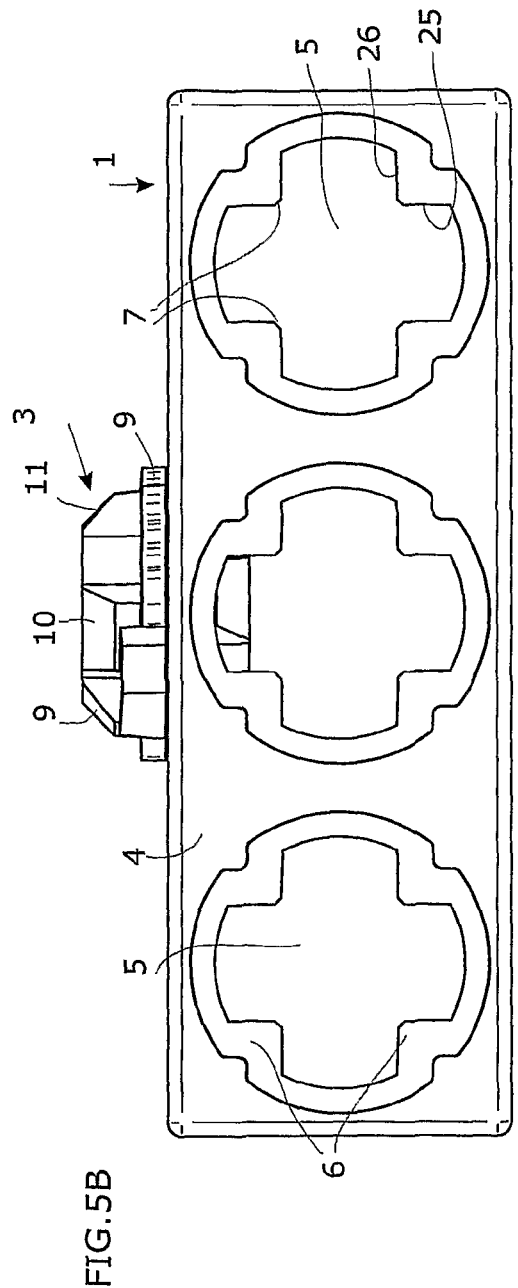
FIG. 5B shows a side view of the object with coupling element as according to FIG. 5A.
Figure 7B:
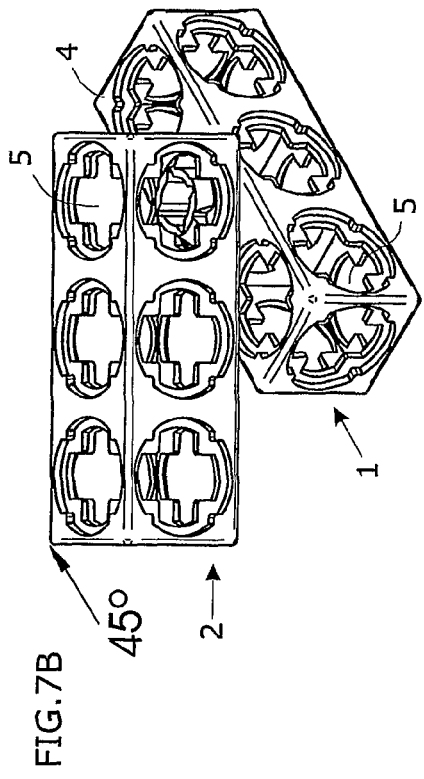
FIGS. 7A, 7B, 7C, 7D, 7E, 7F, 7G and 7H show couplings between two objects with relative orientations of respectively 0°, 45°, 90°, 135°, 180°, 225°, 270° and 315°.
Figure 7D:
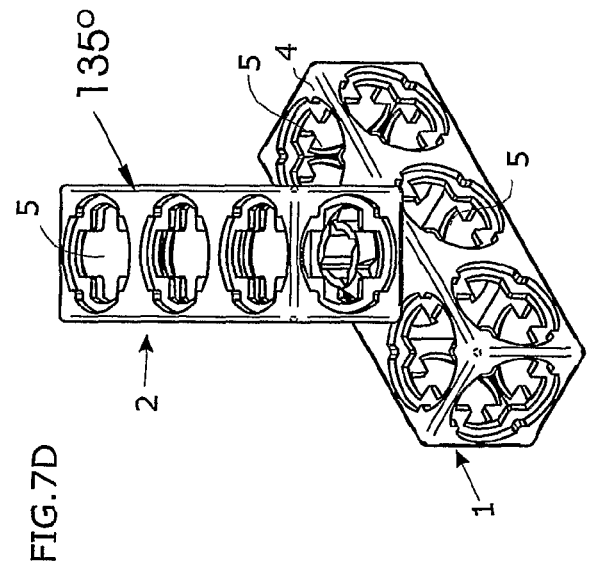
Figure 7A:
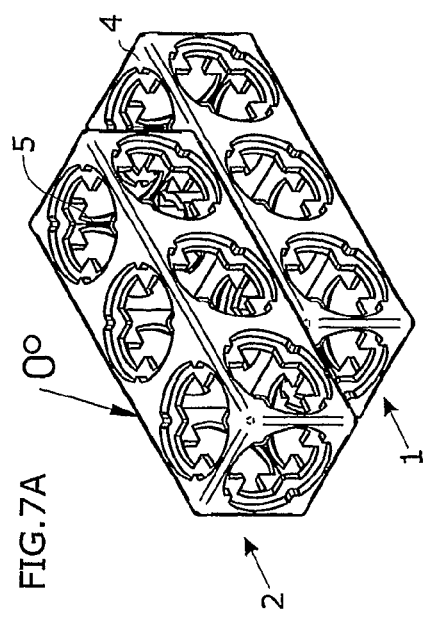
Figure 7C:
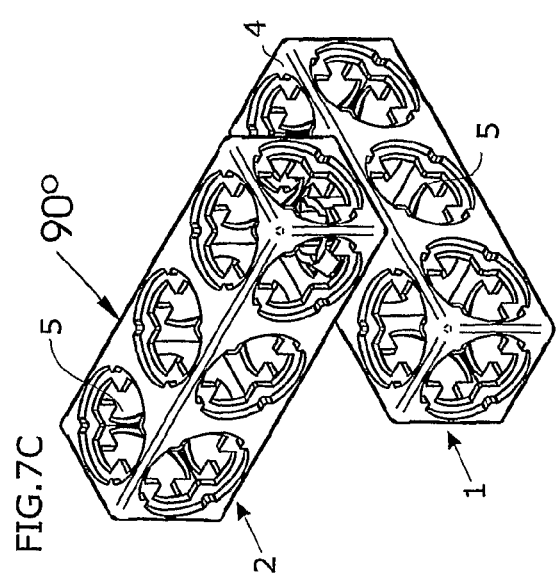
Figure 7E:
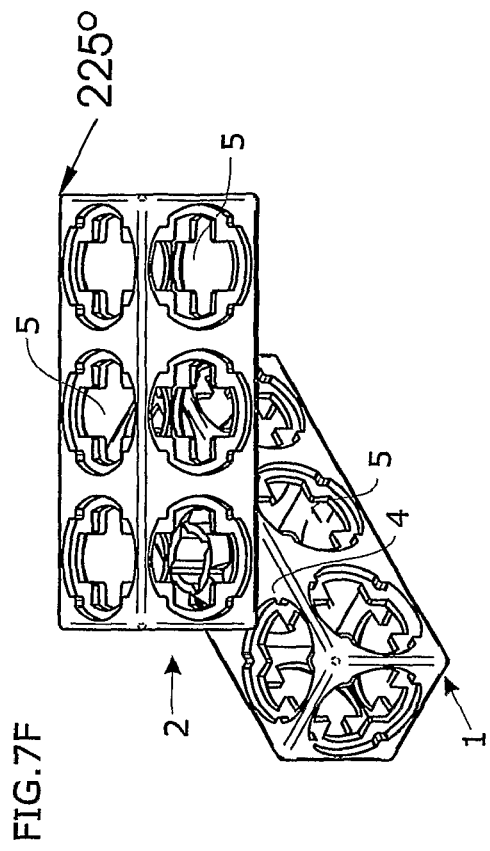
Figure 7F:
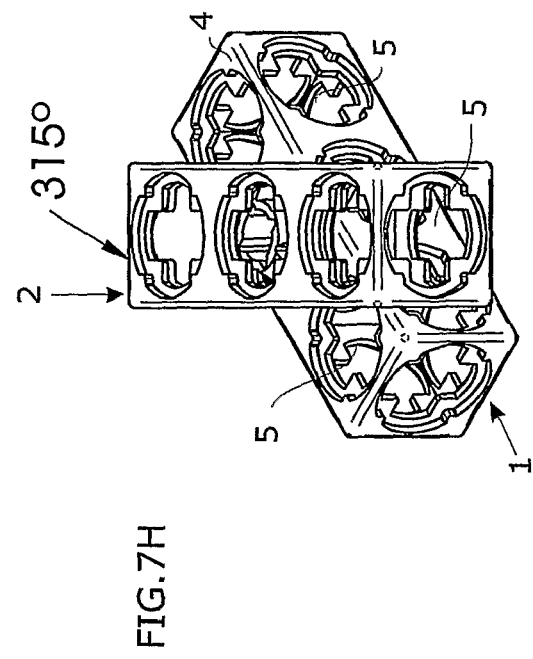
Figure 7G:
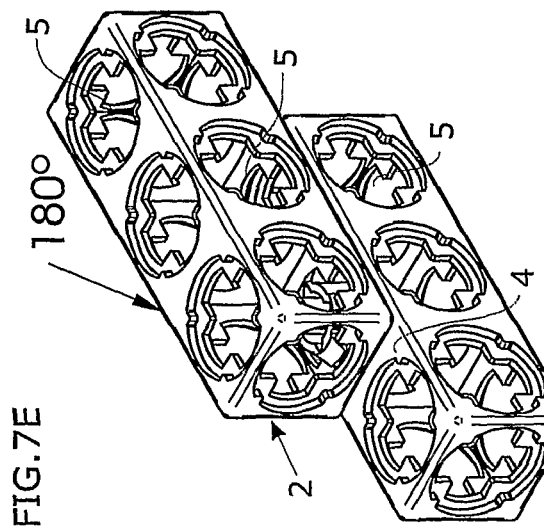
Figure 7H:
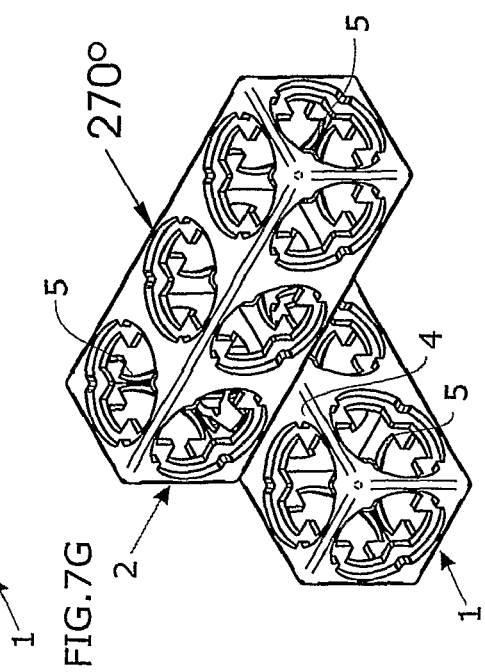

It will be apparent, particularly from FIG. 5A, that in the drawn embodiment the front view and the rear view of the coupling element are identical. Coupling element 3 can therefore be manufactured by (a) making an extrudate using an extrusion head with an opening having the same form as the front view or the rear view of coupling element 3, (b) bringing the extrudate to the desired length, and (c) selectively removing excess portions such that a coupling element 3 is obtained.

It will further be apparent from the drawings that shank 8 has an axially non-round continuous second hole 31 into which a suitable tool can be inserted and that coupling element 3 can then be rotated relative to the relevant object 1, 2 by exerting a moment by means of this tool. The continuous second hole 31 has for this purpose four grooves 32a, 32b, 32c, 32d arranged angularly equidistant and extending over the whole length of hole 31. A screwdriver can for instance be inserted and co-act with grooves 32a, 32c and 32b, 32d lying diametrically opposite each other.

The invention further relates to an object of the type such as object 3 according to the Figure. An object can for instance consist of one panel with at least two continuous holes. It can also be a corner element with two or three panels with a desired number of continuous holes at random. It is also possible to apply a cube having on each of the six square panels one hole or straight rows of holes which can be registered.

A block shape such as the object 1, 2 as according to all of the drawings is also an option.

It is generally practical to ensure that in the case two objects are coupled the created rows of holes have the same centre-to-centre distance as the centre-to-centre distances of the holes in one object.

Not drawn is a modular construction system on the basis of the coupling according to the invention. Such a modular construction system can be supplied in a packaging and comprises a number of objects 1, 2 of the type specified and drawn as example in the Figure, in addition to a number of coupling elements 3 for mutually coupling these objects 1, 2 in the manner specified according to the invention to form a spatial building construction.

It will be apparent that within the stated framework the coupling according to the invention can be embodied in very many different ways. What is essential is that a coupling element 3 is inserted into a first object 1, optionally then in combination with a second object 2 arranged on the other side over the coupling element, whereafter the coupling between coupling element 3 and object 1, 2 is effected by rotation in the one or the other direction. Particularly in the case where coupling element 3 is not readily accessible with the hand, so when coupling element 3 is inserted into two objects 1, 2 arranged on either side, it is practical to make use of the described non-round hole and a suitable tool such as a screwdriver in order to perform the necessary rotation of coupling element 3. A tool can also be used for uncoupling.

The invention claimed is:

1. A coupling comprising first and second tubular objects coupled together by a coupling element;

each of said objects further comprising:
    a panel having an inner surface and an outer surface and a stepped hole having an generally circular outer surface opening and generally circular inner surface opening smaller than the outer surface opening to define a ledge surface at the bottom of a recess, the inner surface opening having four equally spaced inwardly protruding substantially triangular tongues, the outer surface opening having four equally spaced inwardly protruding substantially triangular protrusions;
    the coupling element further comprising:
    a substantially cylindrical shank defining an axial direction, the shank having a first end, second end and central zone and four equally spaced rotation stop ribs extending outwardly from the shank;
    a first pair of oppositely arranged substantially arc shaped resilient insert stop members each having a center recess and two side recesses therein, and each member extending to connect a pair of said ribs;
    a second pair of oppositely arranged substantially arc shaped resilient insert stop members each having three recesses therein and extending to connect a pair of said ribs, the second pair of members being angularly offset from the first pair of members by 90 degrees and axially offset from the first pair of members;
    a first set of four locking cams extending outwardly from the first end of the shank, two opposite cams of said first set of cams extending from two of said ribs in a clockwise direction, another two opposite cams of said first set of cams extending from another two of said ribs in a counterclockwise direction;
    a second set of four locking cams extending outwardly from the second end of the shank, two opposite cams of said second set of cams extending from two of said ribs in a clockwise direction, another two opposite cams of said second set of cams extending from another two of said ribs in a counterclockwise direction, each cam of the second set being connected to a cam of the first set by one of said ribs;
    whereby the first end is insertable into the hole of said first object until the first pair of stop members is received in said first object recess to abut against the first object ledge surface with the center recesses of said first pair of stop members receiving two of said first object protrusions therein;
    whereby the coupling element is then lockable to said first object by either clockwise or counterclockwise rotation of 22.5 degrees until said two protrusions are relocated respectively within two side recesses of said first pair of stop member side recesses with the cams engaging behind the panel; and
    whereby the second end is insertable into the hole of said second object and then lockable to said second object in substantially the same manner that the first end is to the first object.

2. The coupling as claimed in claim 1, further comprising a resilient strip with the main shape of a circular arc, the strip is provided with three recesses which have relative angular positions of −22.5°, 0°, +22.5°.

3. The coupling as claimed in claim 2, further comprising four strips each carried by two adjacent rotation stop members.

4. The coupling as claimed in claim 1, wherein each object, the coupling element, or both, consists of plastic.

5. The coupling as claimed in claim 1, wherein each object, the coupling element, or both, is manufactured by injection-moulding.

6. A method of manufacturing the coupling element as claimed in claim 1, the method comprising the steps of:
    (a) making an extrudate using an extrusion head with an opening having the same form as the front view or the rear view of the coupling element,
    (b) bringing the extrudate to the desired length, and
    (c) selectively removing excess portions such that a coupling element is obtained.

7. The coupling as claimed in claim 1, wherein the shank has an axially non-round continuous second hole into which a suitable tool can be inserted and, by exerting a moment using the tool, the coupling element can then be rotated relative to the relevant object.

8. A modular construction system adapted for use for educational purposes, comprising:
    a number of objects, wherein each object comprises:
    a panel having an inner surface and an outer surface and a stepped hole having an generally circular outer surface opening and generally circular inner surface opening smaller than the outer surface opening to define a ledge surface at the bottom of a recess, the inner surface opening having four equally spaced inwardly protruding triangular tongues, the outer surface opening having four equally spaced inwardly protruding triangular protrusions;
    the coupling element further comprising:
    a cylindrical shank defining an axial direction, the shank having a first end, second end and central zone and four equally spaced rotation stop ribs extending outwardly from the shank;

a first pair of oppositely generally are shaped resilient insert stop members each having a center recess and two side recesses therein, and each member extending to connect a pair of said ribs;

a second pair of oppositely arranged generally arc shaped resilient insert stop members each having three recesses therein and extending to connect a pair of said ribs the second pair of members being angularly offset from the first pair of members by 90 degrees and axially offset from the first pair of members;

a first set of four locking cams extending outwardly from the first end of the shank, two opposite cams of said first set of cams extending from two of said ribs in a clockwise direction, another two opposite cams of said first set of cams extending from another two of said ribs in a counterclockwise direction;

a second set of four locking cams extending outwardly from the second end of the shank, two opposite cams of said second set of cams extending from two of said ribs in a clockwise direction, another two opposite cams of said second set of cams extending from another two of said ribs in a counterclockwise direction, each cam of the second set being connected to a cam of the first set by one of said ribs;

whereby the first end is insertable into the hole of said first object until the first pair of stop members is received in said first object recess to abut against the first object ledge surface with the center recesses of said first pair of stop members receiving two of said first object protrusions therein;

whereby the coupling element is then lockable to said first object by either clockwise or counterclockwise rotation of 22.5 degrees until said two protrusions are relocated respectively within two side recesses of said first pair of stop member side recesses with the cams engaging behind the panel; and whereby the second end is insertable into the hole of said second object and then lockable to said second object in substantially the same manner that the first end is to the first object.

* * * * *

UNITED STATES PATENT AND TRADEMARK OFFICE
CERTIFICATE OF CORRECTION

Page 1 of 1

PATENT NO.         : 8,157,470 B2
APPLICATION NO.    : 12/067615
DATED              : April 17, 2012
INVENTOR(S)        : Gerrit Jan De Wilde It is certified that error appears in the above-identified patent and that said Letters Patent is hereby corrected as shown below:

Column 7, Line 1, Claim 8, delete "generally are" and insert -- arranged generally arc --

Column 7, Line 7, Claim 8, delete "ribs" and insert -- ribs, --

Signed and Sealed this
Thirty-first Day of July, 2012

David J. Kappos
*Director of the United States Patent and Trademark Office*